(12) United States Patent
Bernard et al.

(10) Patent No.: US 8,457,614 B2
(45) Date of Patent: Jun. 4, 2013

(54) WIRELESS MULTI-UNIT CONFERENCE PHONE

(75) Inventors: Bruce V. Bernard, Richmond (CA); Li Hing Kwok, Richmond (CA); Oliver Ren, Richmond (CA); Pichet Thomas Ong, West Jordan, UT (US)

(73) Assignee: Clearone Communications, Inc., Salt Lake City, UT (US)

( * ) Notice: Subject to any disclaimer, the term of this patent is extended or adjusted under 35 U.S.C. 154(b) by 1738 days.

(21) Appl. No.: 11/371,085

(22) Filed: Mar. 9, 2006

(65) Prior Publication Data

US 2006/0227963 A1   Oct. 12, 2006

Related U.S. Application Data

(60) Provisional application No. 60/669,008, filed on Apr. 7, 2005.

(51) Int. Cl.
*H04M 3/42* (2006.01)
*H04B 1/38* (2006.01)

(52) U.S. Cl.
USPC .......................................... 455/416; 455/570

(58) Field of Classification Search
USPC .............. 455/570, 416, 41.1; 379/93.21, 158, 379/202.01, 205.01, 3, 388.02, 406.01–406.16; 348/14.01–14.16
See application file for complete search history.

(56) References Cited

U.S. PATENT DOCUMENTS

| | | |
|---|---|---|
| 3,601,530 A | 8/1971 | Brielle et al. |
| 4,008,376 A | 2/1977 | Flanagan et al. |
| 4,237,339 A | 12/1980 | Bunting et al. |
| 4,268,716 A | 5/1981 | Groves et al. |
| 4,436,966 A | 3/1984 | Botros |
| 4,456,789 A | 6/1984 | Groves et al. |
| 4,489,442 A | 12/1984 | Anderson et al. |
| 4,516,156 A | 5/1985 | Fabris et al. |
| 4,555,598 A | 11/1985 | Flanagan et al. |
| 4,581,758 A | 4/1986 | Coker et al. |
| 4,591,670 A | 5/1986 | Itoh |
| 4,609,787 A | 9/1986 | Horna |
| 4,658,425 A | 4/1987 | Julstrom |
| 4,670,903 A | 6/1987 | Araseki et al. |
| 4,805,205 A | 2/1989 | Faye |
| 4,827,472 A | 5/1989 | Ferrieu |
| 4,864,561 A | 9/1989 | Ashenfelter et al. |

(Continued)

FOREIGN PATENT DOCUMENTS

| | | |
|---|---|---|
| EP | 1519553 A1 | 3/2005 |
| WO | 9704577 A1 | 2/1997 |

OTHER PUBLICATIONS

Wave Industries Ltd, Model OL6010 Wireless Conference Phone, XP-002511726, May 2003.

(Continued)

*Primary Examiner* — Temica M Beamer
*Assistant Examiner* — Joel Ajayi
(74) *Attorney, Agent, or Firm* — TraskBritt, P.C.

(57) ABSTRACT

A wireless conference phone system has a base station to couple at least one conference unit to a telephone network, such as the public switched telephone network (PSTN) or a digital telephone network such as a voice over internet protocol (VoIP) network. Each conference unit performs echo cancellation of the audio signal received from a remote location allowing a simplified base station implementation.

12 Claims, 4 Drawing Sheets

U.S. PATENT DOCUMENTS

| | | | |
|---|---|---|---|
| 4,894,820 A | 1/1990 | Miyamoto et al. | |
| 4,905,937 A | 3/1990 | Spotswood et al. | |
| 4,956,838 A | 9/1990 | Gilloire et al. | |
| 5,003,593 A | 3/1991 | Mihm, Jr. | |
| 5,016,405 A | 5/1991 | Lee | |
| 5,121,426 A | 6/1992 | Baumhauer, Jr. et al. | |
| 5,128,928 A * | 7/1992 | Wilder et al. | 370/263 |
| 5,136,577 A | 8/1992 | Amano et al. | |
| 5,197,098 A | 3/1993 | Drapeau | |
| 5,263,079 A | 11/1993 | Umemoto | |
| 5,272,695 A | 12/1993 | Makino et al. | |
| 5,278,900 A | 1/1994 | Van Gerwen et al. | |
| 5,283,544 A | 2/1994 | Sakurai et al. | |
| 5,283,784 A | 2/1994 | Genter | |
| 5,289,544 A | 2/1994 | Franklin | |
| 5,297,210 A | 3/1994 | Julstrom | |
| 5,305,307 A | 4/1994 | Chu | |
| 5,307,405 A | 4/1994 | Sih | |
| 5,309,517 A | 5/1994 | Barclay | |
| 5,357,511 A | 10/1994 | DiNapoli et al. | |
| 5,371,789 A | 12/1994 | Hirano | |
| 5,404,461 A | 4/1995 | Olnowich et al. | |
| 5,416,829 A | 5/1995 | Umemoto | |
| 5,463,618 A | 10/1995 | Furukawa et al. | |
| 5,471,318 A | 11/1995 | Ahuja et al. | |
| 5,483,588 A | 1/1996 | Eaton et al. | |
| 5,490,247 A | 2/1996 | Tung et al. | |
| 5,506,954 A | 4/1996 | Arshi et al. | |
| 5,515,099 A | 5/1996 | Cortjens et al. | |
| 5,559,873 A | 9/1996 | Wood et al. | |
| 5,559,881 A | 9/1996 | Sih | |
| 5,585,839 A | 12/1996 | Ishida et al. | |
| 5,594,859 A | 1/1997 | Palmer et al. | |
| 5,610,909 A | 3/1997 | Shaw | |
| 5,619,555 A | 4/1997 | Fenton et al. | |
| 5,631,900 A | 5/1997 | McCaslin et al. | |
| 5,633,936 A | 5/1997 | Oh | |
| 5,636,272 A | 6/1997 | Rasmusson | |
| 5,640,540 A | 6/1997 | Ansberry et al. | |
| 5,646,991 A | 7/1997 | Sih | |
| 5,661,813 A | 8/1997 | Shimauchi et al. | |
| 5,666,407 A | 9/1997 | Pfeifer | |
| 5,668,794 A | 9/1997 | McCaslin et al. | |
| 5,686,957 A | 11/1997 | Baker | |
| 5,687,229 A | 11/1997 | Sih | |
| 5,689,553 A | 11/1997 | Ahuja et al. | |
| 5,689,641 A | 11/1997 | Ludwig et al. | |
| 5,708,655 A | 1/1998 | Toth et al. | |
| 5,719,928 A | 2/1998 | Pinnell et al. | |
| 5,732,134 A | 3/1998 | Sih | |
| 5,737,410 A | 4/1998 | Vahatalo et al. | |
| 5,758,079 A | 5/1998 | Ludwig et al. | |
| 5,761,439 A | 6/1998 | Kar et al. | |
| 5,764,901 A | 6/1998 | Skarbo et al. | |
| 5,767,897 A | 6/1998 | Howell | |
| 5,778,053 A | 7/1998 | Skarbo et al. | |
| 5,787,183 A | 7/1998 | Chu et al. | |
| 5,790,177 A | 8/1998 | Kassatly | |
| 5,799,067 A | 8/1998 | Kikinis et al. | |
| 5,799,068 A | 8/1998 | Kikinis et al. | |
| 5,802,294 A | 9/1998 | Ludwig et al. | |
| 5,818,945 A | 10/1998 | Makino et al. | |
| 5,825,754 A | 10/1998 | Williams | |
| 5,832,077 A | 11/1998 | Ciurpita | |
| 5,835,129 A | 11/1998 | Kumar | |
| 5,848,146 A | 12/1998 | Slattery | |
| 5,848,170 A | 12/1998 | Mahieux et al. | |
| 5,850,250 A | 12/1998 | Konopka et al. | |
| 5,854,893 A | 12/1998 | Ludwig et al. | |
| 5,859,914 A | 1/1999 | Ono et al. | |
| 5,862,401 A | 1/1999 | Barclay, Jr. | |
| 5,867,654 A | 2/1999 | Ludwig et al. | |
| 5,883,822 A | 3/1999 | Le Tourneur et al. | |
| 5,884,039 A | 3/1999 | Ludwig et al. | |
| 5,903,629 A | 5/1999 | Campbell, IV et al. | |
| 5,915,091 A | 6/1999 | Ludwig et al. | |
| 5,920,834 A | 7/1999 | Sih et al. | |
| 5,933,494 A | 8/1999 | Yang et al. | |
| 5,933,495 A | 8/1999 | Oh | |
| 5,937,009 A | 8/1999 | Wong et al. | |
| 5,937,060 A | 8/1999 | Oh | |
| 5,940,118 A | 8/1999 | Van Schyndel | |
| 5,953,049 A | 9/1999 | Horn et al. | |
| 5,953,050 A | 9/1999 | Kamata et al. | |
| 5,959,667 A | 9/1999 | Maeng | |
| 5,983,183 A | 11/1999 | Tabet et al. | |
| 5,991,385 A | 11/1999 | Dunn et al. | |
| 6,001,131 A | 12/1999 | Raman | |
| 6,020,916 A | 2/2000 | Gerzberg et al. | |
| 6,026,158 A | 2/2000 | Bayless et al. | |
| 6,035,026 A | 3/2000 | Kim | |
| 6,047,060 A | 4/2000 | Fedorov et al. | |
| 6,049,607 A | 4/2000 | Marash et al. | |
| 6,052,462 A | 4/2000 | Lu | |
| 6,072,522 A | 6/2000 | Ippolito et al. | |
| 6,078,809 A | 6/2000 | Proctor | |
| 6,105,054 A | 8/2000 | Kawashima | |
| 6,122,609 A | 9/2000 | Scalart et al. | |
| 6,125,115 A | 9/2000 | Smits | |
| 6,125,179 A | 9/2000 | Wu | |
| 6,141,529 A | 10/2000 | Remchel | |
| 6,144,667 A | 11/2000 | Doshi et al. | |
| 6,147,979 A | 11/2000 | Michel et al. | |
| 6,148,078 A | 11/2000 | Romesburg | |
| 6,151,397 A | 11/2000 | Jackson, Jr. II et al. | |
| 6,151,621 A | 11/2000 | Colyer et al. | |
| 6,160,886 A | 12/2000 | Romesburg et al. | |
| 6,163,608 A | 12/2000 | Romesburg et al. | |
| 6,163,798 A | 12/2000 | Frank | |
| 6,167,432 A | 12/2000 | Jiang | |
| 6,173,059 B1 | 1/2001 | Huang et al. | |
| 6,178,239 B1 | 1/2001 | Kishinsky et al. | |
| 6,198,693 B1 | 3/2001 | Marash | |
| 6,212,273 B1 | 4/2001 | Hemkumar et al. | |
| 6,212,547 B1 | 4/2001 | Ludwig et al. | |
| 6,240,070 B1 | 5/2001 | Kozdon et al. | |
| 6,246,760 B1 | 6/2001 | Makino et al. | |
| 6,263,078 B1 | 7/2001 | McLaughlin et al. | |
| 6,263,381 B1 | 7/2001 | Freadman | |
| 6,275,258 B1 | 8/2001 | Chim | |
| 6,275,580 B1 | 8/2001 | Faraci et al. | |
| 6,278,785 B1 | 8/2001 | Thomasson | |
| 6,282,176 B1 | 8/2001 | Hemkumar | |
| 6,288,739 B1 | 9/2001 | Hales et al. | |
| 6,323,823 B1 | 11/2001 | Wong et al. | |
| 6,343,314 B1 | 1/2002 | Ludwig et al. | |
| 6,381,224 B1 | 4/2002 | Lane et al. | |
| 6,385,176 B1 | 5/2002 | Iyengar et al. | |
| 6,408,064 B1 | 6/2002 | Fedorov et al. | |
| 6,408,327 B1 | 6/2002 | McClennon et al. | |
| 6,418,472 B1 | 7/2002 | Mi et al. | |
| 6,434,110 B1 | 8/2002 | Hemkumar | |
| 6,442,272 B1 | 8/2002 | Osovets | |
| 6,466,666 B1 | 10/2002 | Eriksson | |
| 6,496,201 B1 | 12/2002 | Baldwin et al. | |
| 6,496,581 B1 | 12/2002 | Finn et al. | |
| 6,507,653 B1 | 1/2003 | Romesburg | |
| 6,516,062 B1 | 2/2003 | Yang et al. | |
| 6,539,219 B1 | 3/2003 | Gallant et al. | |
| 6,542,611 B1 | 4/2003 | Lane et al. | |
| 6,556,682 B1 | 4/2003 | Gilloire et al. | |
| 6,563,803 B1 | 5/2003 | Lee | |
| 6,597,787 B1 | 7/2003 | Lindgren et al. | |
| 6,624,841 B1 | 9/2003 | Buchner et al. | |
| 6,633,647 B1 | 10/2003 | Markow et al. | |
| 6,661,738 B1 | 12/2003 | da Silva et al. | |
| 6,694,018 B1 | 2/2004 | Omori | |
| 6,704,415 B1 | 3/2004 | Katayama et al. | |
| 6,707,489 B1 | 3/2004 | Maeng et al. | |
| 6,718,036 B1 | 4/2004 | Van Schyndel et al. | |
| 6,724,736 B1 | 4/2004 | Azriel | |
| 6,731,344 B2 | 5/2004 | Maeng et al. | |
| 6,754,546 B1 | 6/2004 | Hindus et al. | |
| 6,760,750 B1 | 7/2004 | Boneh et al. | |
| 6,768,796 B2 | 7/2004 | Lu | |
| 6,768,914 B1 * | 7/2004 | Garey | 455/569.1 |
| 6,792,107 B2 | 9/2004 | Tucker et al. | |

| Patent | Date | Inventor |
|---|---|---|
| 6,801,611 B2 | 10/2004 | Guccione et al. |
| 6,836,547 B2 | 12/2004 | Tahernezhaadi |
| 6,839,417 B2 | 1/2005 | Weisman et al. |
| 6,859,531 B1 | 2/2005 | Deisher |
| 6,868,157 B1 | 3/2005 | Okuda |
| 6,906,741 B2 | 6/2005 | Canova, Jr. et al. |
| 6,928,161 B1 | 8/2005 | Graumann |
| 6,931,123 B1 | 8/2005 | Hughes |
| 6,944,289 B2 | 9/2005 | Tahernezhaadi et al. |
| 6,947,549 B2 | 9/2005 | Yiu et al. |
| 6,950,513 B2 | 9/2005 | Hirai et al. |
| 6,961,422 B2 | 11/2005 | Boland |
| 6,961,423 B2 | 11/2005 | Pessoa et al. |
| 6,963,648 B2 | 11/2005 | Wilder |
| 6,980,485 B2 | 12/2005 | McCaskill |
| 6,987,992 B2 * | 1/2006 | Hundal et al. ............. 455/569.1 |
| 6,990,193 B2 | 1/2006 | Beaucoup et al. |
| 7,003,096 B2 | 2/2006 | Lashley et al. |
| 7,016,488 B2 | 3/2006 | He et al. |
| 7,031,269 B2 | 4/2006 | Lee |
| 7,035,397 B2 | 4/2006 | Diethorn |
| 7,043,528 B2 | 5/2006 | Schmitt et al. |
| 7,046,794 B2 | 5/2006 | Piket et al. |
| 7,092,516 B2 | 8/2006 | Furuta et al. |
| 7,096,037 B2 | 8/2006 | Canova, Jr. et al. |
| 7,117,145 B1 | 10/2006 | Venkatesh et al. |
| 7,120,259 B1 | 10/2006 | Ballantyne et al. |
| 7,155,018 B1 | 12/2006 | Stokes, III et al. |
| 7,171,003 B1 | 1/2007 | Venkatesh et al. |
| 7,177,416 B1 | 2/2007 | Zhang et al. |
| 7,190,775 B2 | 3/2007 | Rambo |
| 7,203,308 B2 | 4/2007 | Kubota |
| 7,212,628 B2 | 5/2007 | Popovic et al. |
| 7,215,765 B2 | 5/2007 | Dyba et al. |
| 7,231,036 B2 | 6/2007 | Akie |
| 7,277,423 B1 | 10/2007 | Welch |
| 7,366,237 B2 | 4/2008 | Yu et al. |
| 7,409,455 B2 | 8/2008 | Giloi et al. |
| 2002/0054685 A1 | 5/2002 | Avendano et al. |
| 2002/0101981 A1 | 8/2002 | Sugiyama |
| 2002/0122391 A1 | 9/2002 | Shalit |
| 2002/0126201 A1 | 9/2002 | Schmitt et al. |
| 2002/0140804 A1 | 10/2002 | Comenarez et al. |
| 2003/0002644 A1 | 1/2003 | Guccione et al. |
| 2003/0007633 A1 | 1/2003 | Tucker et al. |
| 2003/0009329 A1 | 1/2003 | Stahl et al. |
| 2003/0026437 A1 | 2/2003 | Janse et al. |
| 2003/0037337 A1 | 2/2003 | Yona et al. |
| 2003/0053617 A1 | 3/2003 | Diethorn |
| 2003/0076025 A1 | 4/2003 | Meinecke |
| 2003/0081504 A1 | 5/2003 | McCaskill |
| 2003/0088622 A1 | 5/2003 | Hwang et al. |
| 2003/0112947 A1 | 6/2003 | Cohen |
| 2003/0117486 A1 | 6/2003 | Ferren et al. |
| 2003/0118167 A1 | 6/2003 | Sammon et al. |
| 2003/0123674 A1 | 7/2003 | Boland |
| 2003/0133565 A1 | 7/2003 | Chang et al. |
| 2003/0138119 A1 | 7/2003 | Pocino et al. |
| 2003/0142200 A1 | 7/2003 | Canova, Jr. et al. |
| 2003/0144004 A1 | 7/2003 | Canova, Jr. et al. |
| 2003/0157929 A1 * | 8/2003 | Janssen et al. ............... 455/416 |
| 2003/0174146 A1 | 9/2003 | Kenoyer |
| 2003/0174661 A1 | 9/2003 | Lee |
| 2003/0184645 A1 | 10/2003 | Biegelsen et al. |
| 2003/0185402 A1 | 10/2003 | Benesty et al. |
| 2003/0219113 A1 | 11/2003 | Bershad et al. |
| 2003/0224815 A1 | 12/2003 | Rodman et al. |
| 2003/0235244 A1 | 12/2003 | Pessoa et al. |
| 2003/0235294 A1 | 12/2003 | Dyba et al. |
| 2003/0235295 A1 | 12/2003 | He et al. |
| 2003/0235312 A1 | 12/2003 | Pessoa et al. |
| 2004/0001137 A1 | 1/2004 | Cutler et al. |
| 2004/0001450 A1 | 1/2004 | He et al. |
| 2004/0058674 A1 | 3/2004 | Yoakum |
| 2004/0062386 A1 | 4/2004 | Tahernezhaadi et al. |
| 2004/0071284 A1 | 4/2004 | Abutalebi et al. |
| 2004/0125942 A1 | 7/2004 | Beaucoup et al. |
| 2004/0141605 A1 | 7/2004 | Chen et al. |
| 2004/0146031 A1 | 7/2004 | Jukarainen |
| 2004/0161101 A1 | 8/2004 | Yiu et al. |
| 2004/0170271 A1 | 9/2004 | Kubota |
| 2004/0199580 A1 | 10/2004 | Zhakov et al. |
| 2004/0208312 A1 | 10/2004 | Okuda |
| 2004/0218745 A1 | 11/2004 | O'Toole |
| 2004/0218752 A1 | 11/2004 | Huang et al. |
| 2004/0228474 A1 | 11/2004 | Taniguchi et al. |
| 2004/0233273 A1 | 11/2004 | Ferren et al. |
| 2004/0236593 A1 | 11/2004 | Swanson et al. |
| 2004/0247111 A1 | 12/2004 | Popovic et al. |
| 2004/0257431 A1 | 12/2004 | Girish et al. |
| 2005/0014490 A1 | 1/2005 | Desai et al. |
| 2005/0018836 A1 | 1/2005 | Beaucoup et al. |
| 2005/0037782 A1 * | 2/2005 | Diethorn et al. ............. 455/462 |
| 2005/0053214 A1 | 3/2005 | Reding et al. |
| 2005/0078172 A1 | 4/2005 | Harville et al. |
| 2005/0084116 A1 | 4/2005 | Schulz et al. |
| 2005/0091380 A1 | 4/2005 | Gonen et al. |
| 2005/0094792 A1 | 5/2005 | Berthoud et al. |
| 2005/0094795 A1 | 5/2005 | Rambo |
| 2005/0123129 A1 | 6/2005 | Awad et al. |
| 2005/0129225 A1 | 6/2005 | Piket et al. |
| 2005/0140779 A1 | 6/2005 | Schulz et al. |
| 2005/0153716 A1 | 7/2005 | Bodley |
| 2005/0157866 A1 | 7/2005 | Marton et al. |
| 2005/0175190 A1 | 8/2005 | Tashev et al. |
| 2005/0192768 A1 | 9/2005 | Tashev |
| 2005/0206721 A1 | 9/2005 | Bushmitch et al. |
| 2005/0207566 A1 | 9/2005 | Ohki et al. |
| 2005/0213731 A1 | 9/2005 | Rodman et al. |
| 2005/0213739 A1 * | 9/2005 | Rodman et al. .......... 379/202.01 |
| 2005/0231586 A1 * | 10/2005 | Rodman et al. ............ 348/14.07 |
| 2005/0232441 A1 | 10/2005 | Beaucoup et al. |
| 2005/0259601 A1 | 11/2005 | Rosenberg et al. |
| 2005/0271194 A1 | 12/2005 | Woods et al. |
| 2005/0271220 A1 | 12/2005 | Bathurst |
| 2005/0283328 A1 | 12/2005 | Tashev |
| 2005/0283536 A1 | 12/2005 | Swanson et al. |
| 2005/0283813 A1 | 12/2005 | Jamail et al. |
| 2005/0286696 A1 | 12/2005 | Bathurst et al. |
| 2005/0286697 A1 | 12/2005 | Bathurst et al. |
| 2005/0286698 A1 | 12/2005 | Bathurst et al. |
| 2005/0286714 A1 | 12/2005 | Tokuda |
| 2006/0013383 A1 | 1/2006 | Barron et al. |
| 2006/0013412 A1 | 1/2006 | Goldin |
| 2006/0013416 A1 | 1/2006 | Truong et al. |
| 2006/0018457 A1 | 1/2006 | Unno et al. |
| 2006/0018458 A1 | 1/2006 | McCree et al. |
| 2006/0018459 A1 | 1/2006 | McCree |
| 2006/0018460 A1 | 1/2006 | McCree |
| 2006/0034448 A1 | 2/2006 | Parry |
| 2006/0047749 A1 | 3/2006 | Davis et al. |
| 2006/0047750 A1 | 3/2006 | Schmitt et al. |
| 2006/0067519 A1 | 3/2006 | Stenger |
| 2006/0069556 A1 | 3/2006 | Nadjar et al. |
| 2006/0087982 A1 | 4/2006 | Kuure et al. |
| 2006/0088173 A1 | 4/2006 | Rodman et al. |
| 2006/0104458 A1 | 5/2006 | Kenoyer et al. |
| 2006/0140392 A1 | 6/2006 | Ahmadi |
| 2006/0146015 A1 * | 7/2006 | Buchmann ................... 345/156 |
| 2006/0147029 A1 | 7/2006 | Stokes, III et al. |
| 2006/0165020 A1 | 7/2006 | Schultz |
| 2006/0182130 A1 | 8/2006 | Even et al. |
| 2006/0182268 A1 | 8/2006 | Marton |
| 2006/0182311 A1 | 8/2006 | Lev |
| 2006/0193466 A1 | 8/2006 | Rodman |
| 2006/0198329 A1 | 9/2006 | Fang et al. |
| 2006/0198511 A1 | 9/2006 | Su et al. |
| 2006/0221177 A1 | 10/2006 | Chu et al. |
| 2006/0222172 A1 | 10/2006 | Chhetri et al. |
| 2006/0227963 A1 | 10/2006 | Bernard |
| 2006/0251093 A1 | 11/2006 | Curcio et al. |
| 2007/0019803 A1 | 1/2007 | Merks et al. |
| 2007/0021958 A1 | 1/2007 | Visser et al. |
| 2007/0038442 A1 | 2/2007 | Visser et al. |
| 2007/0047738 A1 | 3/2007 | Ballantyne et al. |
| 2007/0058798 A1 | 3/2007 | Takada |
| 2007/0058799 A1 | 3/2007 | Sudo |
| 2007/0064925 A1 | 3/2007 | Suzuki et al. |

| | | |
|---|---|---|
| 2007/0071254 A1 | 3/2007 | Marton |
| 2007/0081075 A1 | 4/2007 | Canova, Jr. et al. |
| 2007/0092074 A1 | 4/2007 | Takada |
| 2007/0093714 A1 | 4/2007 | Beaucoup |
| 2007/0116225 A1 | 5/2007 | Zhao et al. |
| 2007/0117556 A1 | 5/2007 | Rogalski |
| 2007/0121925 A1 | 5/2007 | Cruz-Zeno et al. |
| 2007/0127400 A1 | 6/2007 | McKibben et al. |
| 2007/0133442 A1 | 6/2007 | Masuda et al. |
| 2007/0140059 A1 | 6/2007 | Guion et al. |
| 2007/0147634 A1 | 6/2007 | Chu |
| 2007/0147644 A1 | 6/2007 | Bodley et al. |
| 2007/0149246 A1 | 6/2007 | Bodley et al. |
| 2007/0154001 A1 | 7/2007 | Rambo |
| 2007/0156908 A1 | 7/2007 | Szomolanyi et al. |
| 2007/0165106 A1 | 7/2007 | Groves et al. |
| 2007/0175998 A1 | 8/2007 | Lev |
| 2007/0189508 A1 | 8/2007 | Knutson et al. |
| 2007/0189547 A1 | 8/2007 | Hsu et al. |
| 2007/0201435 A1 | 8/2007 | Fisher |
| 2007/0206089 A1 | 9/2007 | Eshkoli et al. |
| 2007/0285506 A1 | 12/2007 | Schneider |
| 2007/0297454 A1 | 12/2007 | Brothers |
| 2007/0299983 A1 | 12/2007 | Brothers |
| 2008/0049921 A1 | 2/2008 | Davis et al. |
| 2008/0140415 A1 | 6/2008 | Shostak |
| 2009/0257568 A1 | 10/2009 | Suder et al. |

OTHER PUBLICATIONS

European search report, Feb. 4, 2009 in European Patent Appl. No. 06251596.0.

Abel & imray, response filed Mar. 29, 2010 in European Patent Appl. No. 06251596.0.

* cited by examiner

WIRELESS MULTI-UNIT CONFERENCE
PHONE

CROSS-REFERENCE TO RELATED
APPLICATIONS

This application claims priority from U.S. Provisional Patent Application 60/669,008 filed Apr. 7, 2005.

FIELD OF THE INVENTION

The present invention relates generally to conference telephones. More particularly, the present invention relates to a wireless handsfree conference phone system.

BACKGROUND OF THE INVENTION

Conference phones are commonly used in a number of environments, such as meeting rooms, conference rooms, boardrooms and the like, to allow a group of people at a single location to participate in a phone call.

Many standard telephone sets can provide rudimentary conference abilities through a handsfree mode that uses a speaker and a microphone to communicate audio larger distances from the handset. To avoid echo, many such telephone sets employ half duplex switching so that the microphone and speaker are not active simultaneously. While half duplex switching allows a number of people to sit at a single location and participate in a call, there are a number of short comings to such a rudimentary conferencing capability. For instance, any noises in the room will cut off the far-end audio. Thus speaking, coughing, or paper shuffling will all prevent any inbound audio from being heard. This soon results in halting discussion patterns over the telephone link to the point where even a request to repeat a missing point may not be heard.

A conference phone is typically defined by having two features. The first feature is the ability to provide a speaker supporting full duplex audio capability that permits simultaneous transmission and reception of audio, and the second feature is a multi-line capability which provides the ability to use more than one phone line to serve as a rudimentary conference bridge. The availability of third party dial in conference bridges has made the multi-line capability feature of these phones redundant to a certain degree, but the feature is still considered to be a standard conference phone offering.

In large environments, a simple telephone handset in a speakerphone mode is unsuitable as a conference room phone. In large rooms, the audio quality provided by standard speakerphone implementations is not sufficient. To address this problem, dedicated conference phones are provided.

Dedicated conference phones, such as those offered by Polycom, Inc., ClearOne etc. provide only a handsfree experience. The conventional handsfree conference phone provides a dial pad and display to allow the user to dial and create a conference session. The phone typically has a plurality of microphones, and a single speaker. By using a plurality of microphones, the system can switch between active and passive microphones based on the position of a person speaking.

One common problem with conference phones is echo. When a remote participant in the call speaks, the voice is reproduced through the speaker of the unit. This sound is then received by the microphones as input, and is provided back to the remote participant with a slight delay. This causes an apparent echo that is often found to be distracting. To address this matter early solutions employed a half-duplex design, so that the microphones and the speaker do not operate simultaneously. A more sophisticated full duplex solution is presently found in dedicated conference phones. The full duplex solution makes use of echo-canceling circuitry to analyze the received signal and subtract that signal from the signal generated by the microphones allowing the speaker and microphones to operate simultaneously.

To address the needs of larger boardrooms, many conference phone systems make use of slaved microphone units that allow corded satellite units to connect to a central unit. The echo cancellation then factors in the sounds received at all the microphones, including those from the satellite units.

Recently wireless conference phones have been introduced to allow the phone to be moved between conference rooms or to be easily repositioned in a conference room. These wireless units are virtually identical to their wired analogs, but replace the cord between the phone and a wall jack with a wireless link to a base station connected to the telephone wall jack. These wireless units do not typically offer satellites, and when they do, the satellites are connected to the phone with wires, thus limiting the high degree of mobility and flexibility offered by the wireless phone unit. These wireless units cannot serve large meeting rooms without the ability to attach satellite units.

Outside of conference phones, simply using a plurality of telephone handsets connected to a single base station is known. This has not been implemented for conference phones due to the great complexity of dealing with echo cancellation across a plurality of different phones each connected to the base station but not to each other.

It is, therefore, desirable to provide a wireless conference phone system with the ability to support larger conference rooms.

SUMMARY OF THE INVENTION

It is an object of the present invention to obviate or mitigate at least one disadvantage of previous wireless conference phones.

Other aspects and features of the present invention will become apparent to those ordinarily skilled in the art upon review of the following description of specific embodiments of the invention in conjunction with the accompanying figures.

Generally, the present invention provides a method and system for connecting a plurality of wireless conference units to an outside world telephone network.

Whereas previous conference phone systems employed sophisticated switching and echo cancellation in the phone for both a main or master conference phone and each satellite or slave unit, this technique is not optimal for wireless systems. A preferred configuration has wireless conference phone units that do not talk directly to each other, but rather communicate with a base station. The wireless conference phone units, also referred to as PODs, relay information to a base station, which connects the PODs to the outside world telephone network. The outside world telephone network carries call signaling and audio communications between a near-end location and a far-end location. There are many forms of telephone networks that can advantageously be used, for instance, the public switched telephone network (PSTN), a Voice over Internet Protocol (VoIP) telephone network service over the Internet, a cellular telephone network and the like.

Whereas previous conference phone systems have employed sophisticated switching and echo cancellation incorporated into the base phone and each satellite phone, this technique is not always optimal or suitable for wireless conference phone systems.

In accordance with the invention, wireless conference phone units, or PODs are in communication with a base unit connected to a telephone network. The PODs exchange call signaling and audio communications with a base unit that connects them to the outside world telephone network. In a presently preferred embodiment, each POD operates independently. This allows the POD to be used alone and extra PODs are added as needed to allow coverage of larger conference rooms. As a result, the PODs are not designed to communicate with each other in a master-slave configuration or with a central POD relaying echo cancellation information to the other PODs. However, building complex circuitry in the base station for multi-POD echo cancellation drives up the cost of the base station when the base station will often be used to support only a single POD unit.

In accordance with the invention a telephone network interface is provided in a base station connected to an outside world telephone network. The audio signal received at the base from the telephone network is transmitted to each POD over a wireless channel. Each POD reproduces the received audio signal on its loudspeaker. Thus far-end audio is reproduced for the near-end conference participants on the speakers of the PODs. The POD microphones pick up near-end audio, which is processed in the POD to remove the loudspeaker audio cross-talk also picked up by the POD microphones. The processed near-end audio signal from each respective POD is transmitted to the base station over a unique wireless channel. The base station receives near-end audio signalling from each POD and sums them all together and delivers the result to the outside world telephone network for transport to the far-end participants. Because the PODs are all located in the same conference room, there is no need to have each POD receive and play the audio generated by other POD units in the room. This simplifies the implementation of the base station and allows for a plurality of independent PODs to connect to the same base station and provide complete coverage in a large conference room environment. The base unit has a processor providing a signal processing capability to perform more complex processing of the received near-end audio signals beyond simply adding them together. For example, a weighted addition process is used, or such other processing as may be desirable, to provide a suitable near-end audio signal for transmission over the telephone network to the outside world. However, the signal processing in the base ensures that the audio signal received from one POD is not delivered to another POD. That is no side-tone is provided to any POD by the signal processing at the base station. The near-end audio signal is delivered only to the telephone network and not to any of the PODs.

In one of its aspects the invention provides a conference phone system comprising a base station having a telephone line interface, a POD interface and a base control processor coupled to the telephone line interface and the POD interface operable to exchange call control and audio communications signalling between the telephone line interface and the POD interface. The conference phone system has at least one POD unit, each such POD unit having a microphone system, a loudspeaker, a base interface and a POD control processor interconnecting the microphone system, loudspeaker and base interface to exchange communications signalling with the base station via the POD interface and base interface and operable to filter out audio signalling received over the base interface from the signal produced by the microphone system supplied to the base interface.

In another of its aspects the invention provides a method for conducting a conference call using a base station with a call control processor controlling a telephone line interface connected to a telephone network and a POD interface operable to exchange call control and audio communications signalling between the telephone network and the POD interface and at least one POD control processor unit controlling a microphone system, a loudspeaker and a base interface to exchange communications signalling with the base station POD interface. The method comprises the steps of producing audio output on each POD loudspeaker corresponding to audio signalling received from the telephone network; then performing echo cancellation processing at the POD control processor on the audio signalling produced by the microphone system to remove the audio output received from the telephone network and delivering the echo cancellation output produced by each POD to the base station call control processor for summing and delivery into the telephone network.

Embodiments of the present invention will now be described, by way of example only, with reference to the attached figures, wherein:

DETAILED DESCRIPTION

The following discussion provides an exemplary embodiment of the present invention. Those skilled in the art will realize that although this discussion is made with reference to specific embodiments, the specific embodiments are not intended as being limiting, but rather are intended solely to provide examples of embodiments of the invention.

Figure 1:
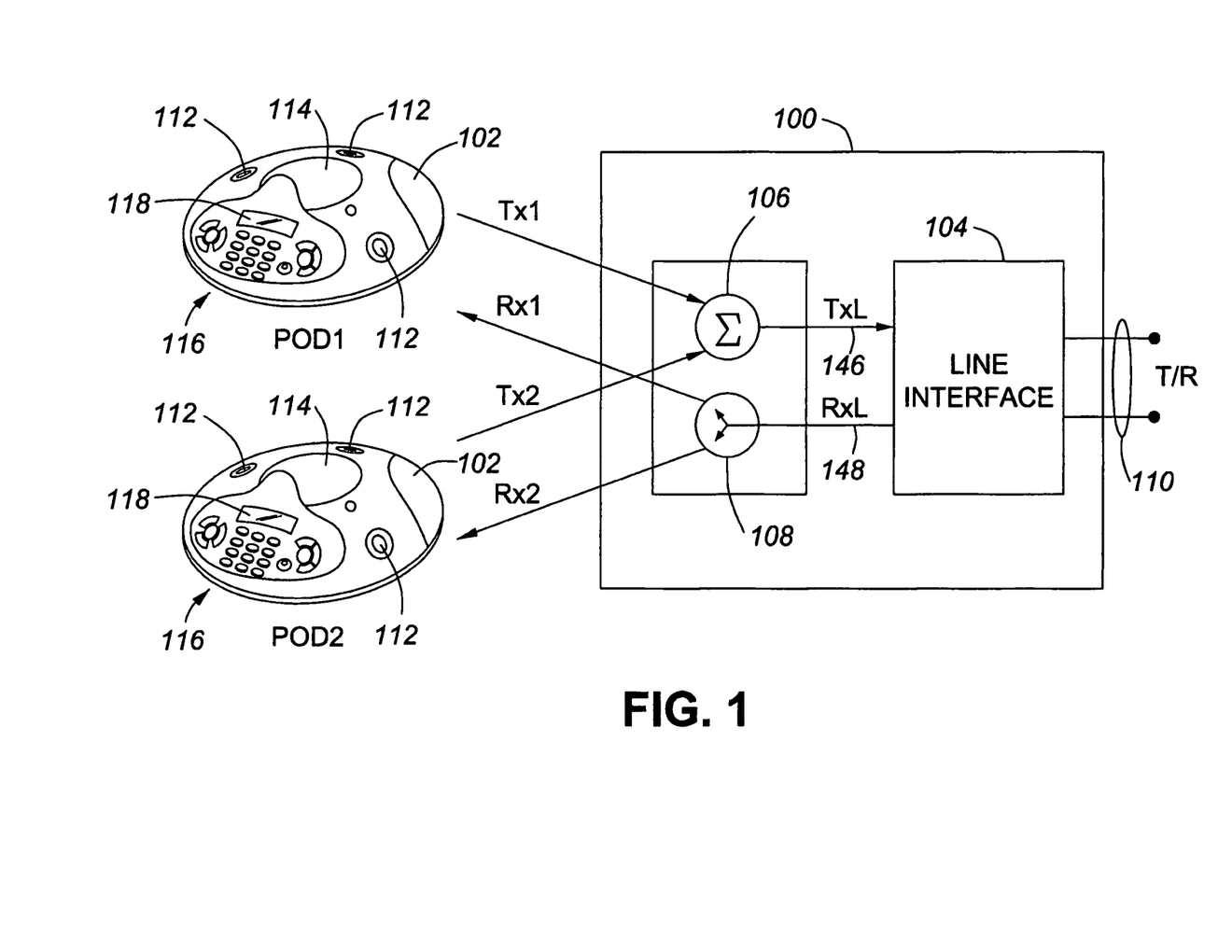
FIG. 1 is a functional block diagram of an exemplary embodiment of the invention having two wireless POD conference units and a base unit.

As shown in FIG. 1, a basic setup of an exemplary conference telephone system comprises a base station unit 100 and two wireless POD units 102. The base station and POD units communicate over radio frequency (RF) wireless channels, such as in the 2.4 GHz standard ISM RF band. The base station 100 is connected to the outside world telephone network 110 and to the wireless PODs 102. Each POD has a respective microphone system 112 and a loudspeaker 114. Preferably the POD microphone system 112 has 3 microphones to pick up audio in all directions around the POD. The wireless PODs are placed within a conference room to position the POD microphones system 112 as close as practicable to each of the conference call participants. During a phone conversation, near-end speech is picked up dynamically by one or more of the POD microphones and far-end speech is reproduced on each respective POD loudspeaker 114.

A POD has a keypad 116 providing a user input mechanism to control calling on the system. The keypad has a plurality of switches typically including an on/off switch, an offhook/onhook switch, a volume control, a mute switch and a telephone dialing keypad group of switches, that is, a plurality of key switches labeled to include the numbers 0 to 9, asterisk (*) and octothorp (#).

The keypad switches are manipulated by a user to answer or place a call over the telephone network. When both PODs are powered up, pressing offhook on one POD preferably activates the other POD as well so that both PODs are in communication with the base station and telephone network. Dialing, muting and going onhook/offhook is done using the keypad of either POD. The PODs have a display 118 to provide call and status information to the users, for example, caller ID, dialed number, transient display of volume levels when the volume controls are manipulated etc.

A telephone network line interface 104 couples the base to an outside world telephone network 110 and supports call supervisory signalling and audio communication over the telephone network. The audio received from the telephone network is provided as the RxL signal on line 148 which is split at 108 into separate Rx(i) signals for each POD. Thus for the example embodiment employing two PODs, two signals Rx1 and Rx2 are produced and sent from the base via RF to each POD simultaneously. The return audio transmitted from each POD, Tx1 and Tx2, is sent via RF to the base unit 100 where each is summed as depicted by summer 106. The summed audio signal is then provided as the TxL signal on line 146 to the telephone network line interface 102 for supply to the outside world telephone network 110. In the base, no side-tone or reflection of the transmitted audio received from a POD, i.e. Tx(i), that is, Tx1 and Tx2 in the two POD embodiment depicted in the figure, appears on the Rx audio signal that the base sends back to another POD.

In accordance with the invention, each POD performs Rs own acoustic echo cancellation so that echo and howling coming from a POD is virtually eliminated. Near-end speech picked up by a POD is sent out to the outside world telephone network 110 by the base unit 100 and is not echoed back to itself or to another POD.

With the ability of the base to block near-end audio of one POD from appearing at another POD, the above arrangement is suitable to allow multiple PODs to be used. The number of PODs that can be used advantageously to communicate audio simultaneously with the base is not limited to the two PODs depicted in the exemplary configuration of FIG. 1. Three or more PODs can be deployed where the maximum number of PODs will depend on the number of available radio channels and time slots provided in the system wireless design. Thus, in accordance with the invention, near-end audio echo cancellation is performed in the PODs, and consequently a simple base station implementation is achieved that does not greatly increase either the complexity or cost of producing the base station unit.

Figure 2:
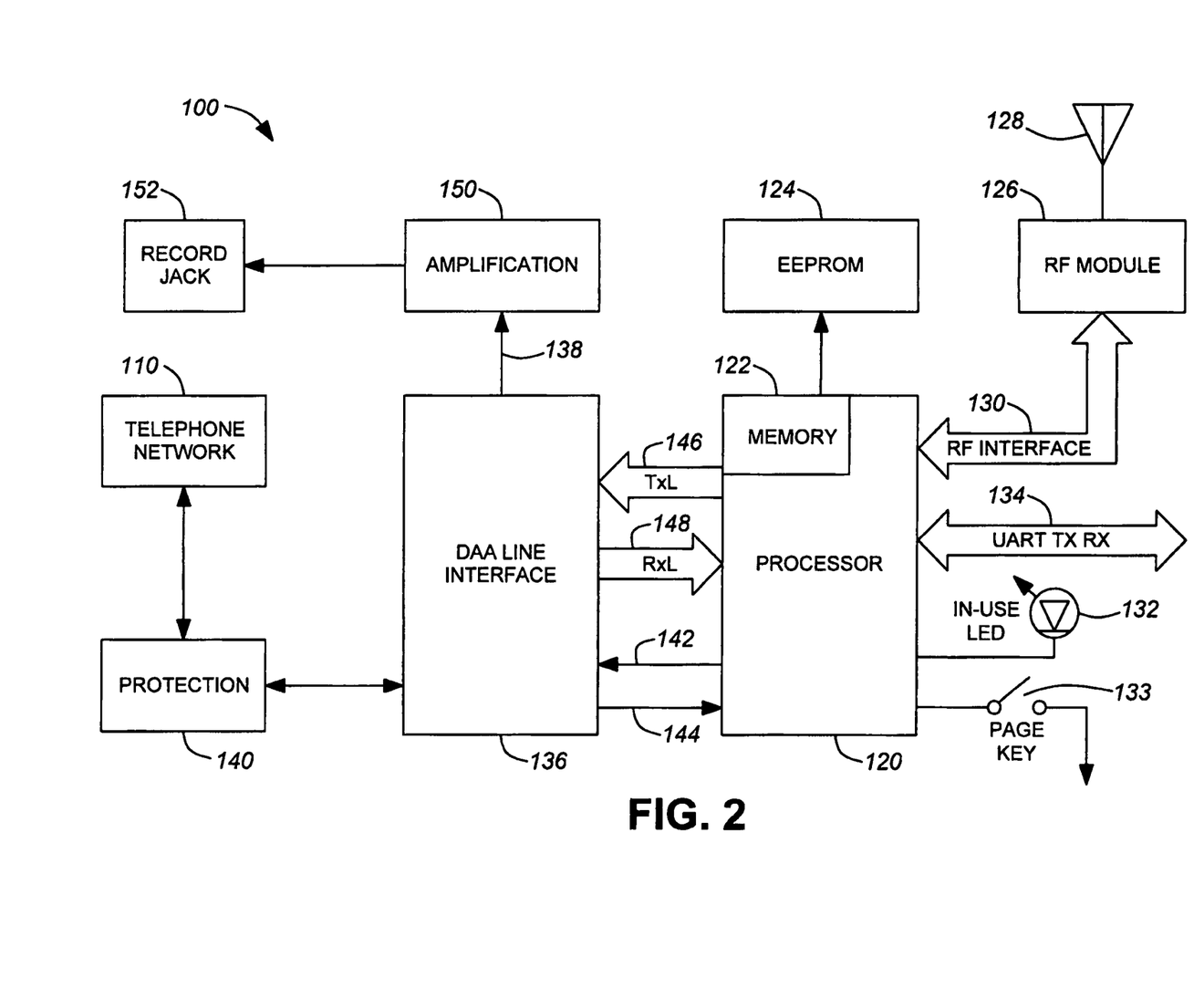
FIG. 2 is a functional block diagram of a base unit providing a PSTN line interface.

FIG. 2 is a functional block diagram of a preferred embodiment of the base station unit 100. The base has a processor 120 which controls the operation of the elements of the base system. A suitable processor in this regard is a DECT baseband processor produced by National Semiconductor in the SC144xx part family. The base processor 120 runs program code stored in memory 122, for example an internal flash memory, and any variables and operating parameters are kept in memory 124, which, in the preferred embodiment, is a 16 kbit external EEPROM serial memory device.

Figure 4:
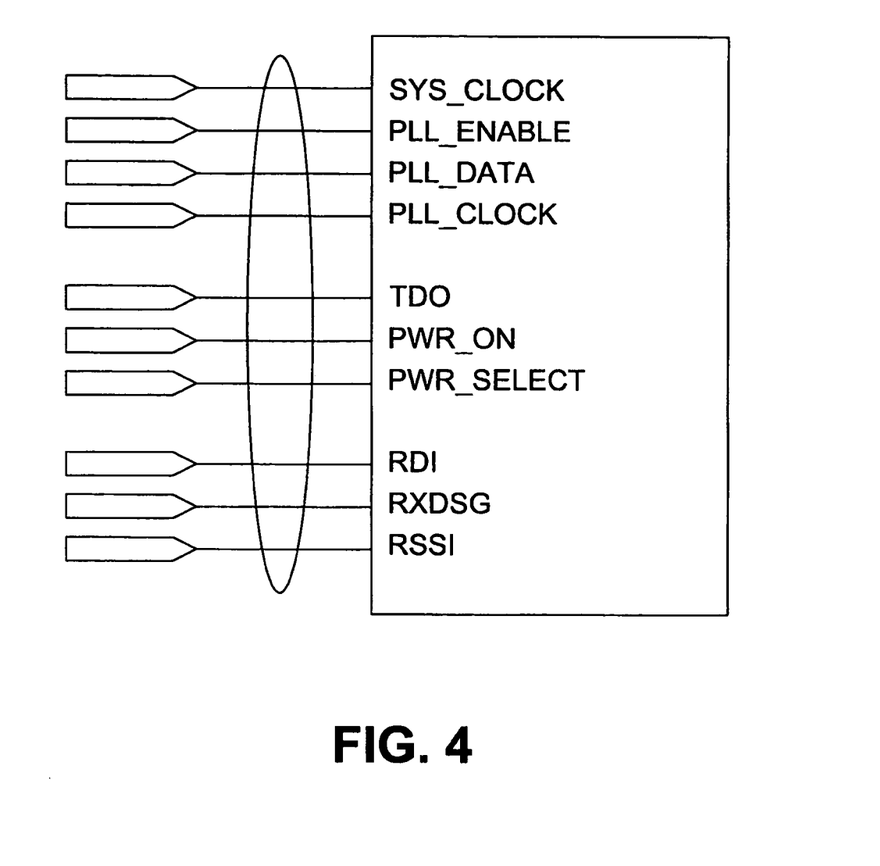
FIG. 4 is a schematic of an RF interface provided in the POD and the base units.

The processor 120 also provides the necessary RF control signals to the RF module 126 over RF interface 130, which is described in more detail in the discussion relating to FIG. 4. The base RF module 126 transmits and receives digital information with each POD using a suitable radio antenna 128, for example, one configured for use in the 2.4 GHz ISM band.

For a user interface, the base processor 120 drives an in-use indicator 132, for example light emitting diode (LED), to indicate when a connection with the outside world telephone network is active. Where the outside world telephone network is the PSTN as depicted in the embodiment of FIG. 2, the in-use indicator 132 will indicate that the data access arrangement (DM) line interface 136 has gone off-hook, for example, to dial an outgoing call or to carry on a conversation over the telephone network. Preferably the base includes a page key 133 to page the PODs. In the preferred embodiment, the base has a page key 133, such as a push button switch, that is polled by the base processor and when the page key is pressed, the base signals the PODs causing them to emit an audible signal to enable a user to locate any POD units registered to the base.

Preferably the base provides a test and update connector 134, such a connector to a Universal Asynchronous Receiver Transmitter (UART) interface, to enable firmware download and testing functions to be performed.

A suitable outside world telephone network line interface is provided in the base to support call supervisory signalling with the telephone network and to facilitate audio communication over the telephone network. In the exemplary embodiment, the outside world telephone network is the PSTN and consequently the telephone network interface is configured to connect to the PSTN. A PSTN interface is implemented using a digital access arrangement device, depicted as DAA line interface 136 and protection elements 140. The DAA line interface 136 provides PSTN data terminal equipment/customer premise equipment functionality to terminate the connection to the PSTN 110. A suitable DM line interface device is manufactured by Clare, Inc. in their Lite Link (trade-mark) product family parts numbered as CPC5620x. The protection elements 140 include fuses, capacitors and sideactors suitably configured for overcurrent and overvoltage protection to provide the necessary electrical isolation between the outside world telephone network 110 and the rest of the base unit circuitry. For other outside world telephone networks, such as VoIP, the devices provided for the telephone network line interface 104 (of FIG. 1) will be selected for operation with the media link characteristics and protocols of such other networks.

The base processor 120 has connections or lines for communication with and control of the other devices in the base unit. For instance, to provide call supervisory signaling to the outside world telephone network, an onhook control line 142 controls the on-hook/off-hook operation of the DM line interface 136 to allow the base to initiate, receive or terminate a call over the telephone network 110. The DAA line interface produces an audio signal converted from the far-end audio received over the telephone network into the RxL signal 148. The digital near-end audio received from each of the PODs via antenna 128 is processed and summed by the base processor 120 and the result is supplied as the TxL signal 146 to the DAA line interface 136 for conversion to a suitable analogue form signal for delivery into the outside world telephone network 110.

The DM interface 136 also has an on-hook ring detect line 144 to signal processor 120 of an incoming call. The incoming call is reported to each POD which responds by causing ring signaling to be produced on the POD, for example over the POD loudspeakers 114, and any available caller ID details are displayed on the POD display 118. In the preferred embodiment, the base includes a record jack 152 to facilitate telephone conversation recording. To provide this capability, an analogue version of the TxL and RxL transmit and receive audio signals is supplied to an amplifier 150 which provides an amplified output that is then available to a recording device connected to recording jack 152.

Figure 3:
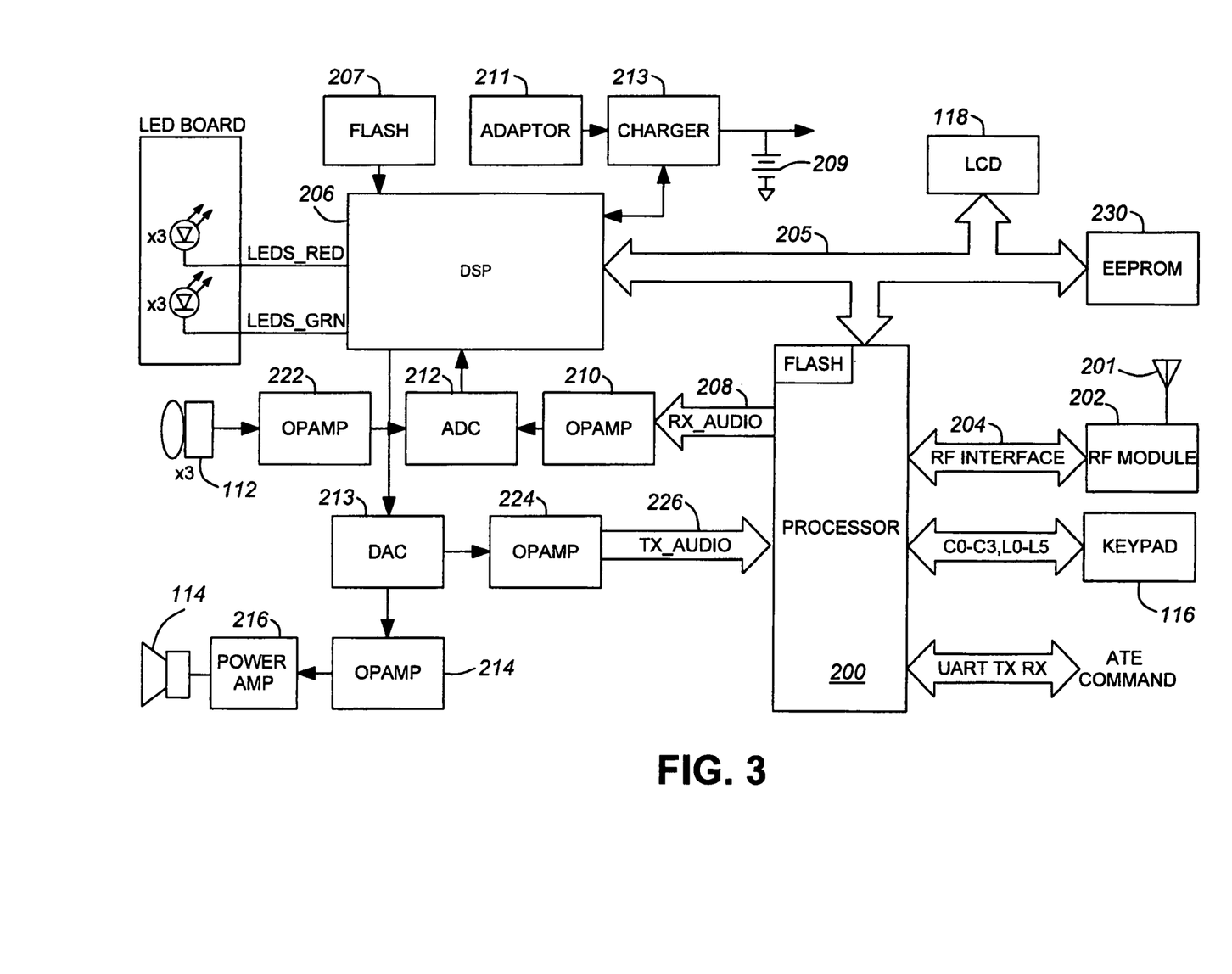
FIG. 3 is a functional block diagram of a wireless POD conference unit.

FIG. 3 is a functional block diagram of elements in a preferred embodiment of a POD unit constructed in accordance with the principles of the invention. The POD 102 has a control processor 200 such as a DECT baseband processor produced by National Semiconductor in the SC144xx part family. The POD further includes an RF module 202, an RF interface 204, keypad 116 and status indicators 228. A Digital Signal Processor (DSP) 206, such as a DSP manufactured by Freescale Semiconductor in the DSP563xx part family, carries out speech signal processing tasks. The POD also has related circuitry for the microphones, loudspeakers, ADC/DAC operations and battery charging function.

The POD is in wireless communication with the base over a radio channel and each POD has an antenna 201 to transmit and receive radio frequency signaling over the channel. Rx(i) signalling from the base to the POD is received on the POD antenna 201 and supplied to the POD RF module 202 for conversion and recovery of the data contained in the radio signalling. The recovered data is supplied to the POD processor 200 over RF interface 204. RF interface 204 supports bi-directional communication between the POD processor 200 and the RF module 202. Consequently, data from the POD to be delivered over the radio channel to the base is supplied to the RF module 202 by the POD processor over RF interface 204. The RF module 202 in turn converts and encodes the received data onto a radio signal, Tx(i), that is delivered into the radio channel by antenna 201.

When digital speech audio information sent by the base is received by the POD control processor 200 from the POD RF module 202, the POD control processor 200 converts the digital speech into analog form and then transmits it to the DSP unit via a differential interface RX_AUDIO 208. This analog audio is amplified and converted again into a digital data stream at OPAMP 210 and ADC 212 respectively for supply to the DSP 206. As a consequence, the DSP is provided with input representative of the received audio. The DSP then performs signal processing of the signal and the resultant digital audio output is converted to analog form at DAC 213. An OPAMP 214 and power AMP 216 amplify this audio signal and drive the POD loudspeaker 218 thus reproducing far-end audio at the POD.

For the near-end audio, the user speech is picked up by the microphone system 112. Preferably the microphone system 112 has three microphones, shown as MIC[1 . . . 3] in the drawings, arranged to pick up audio from all directions surrounding the POD. The microphone signals are amplified at corresponding OPAMPs 222 and supplied to an analogue to digital converter ADC 212 which converts them to digital for signal processing steps performed by the POD DSP 206. The POD DSP 206 performs the speech processing, for example, removing from the Tx(i) signal sent to base processor 120 any cross talk or local feedback of the Rx output picked up by the microphones. The resultant digital data is sent to a digital to analogue converter DAC 214, where the output data is converted to analogue and supplied to an OPAMP 224 which outputs a differential analog signal TX_AUDIO carried on line 226 to the POD control processor 200. The POD control processor 200 receives this signal and converts it into digital data and transmits it to the base via the RF module 202 as the POD's Tx(i) signal, two examples of which are shown as the Tx1 and Tx2 signals in the two POD configuration of FIG. 1.

The POD processor 200 and the DSP 206 also communicate via a bus interface, 205. Bus interface 205 is coupled to display 118 to enable processor 200 to provide status information, such as number dialed, caller ID and the like on the display 118. A memory 230, such as an electrically erasable programmable read only memory is coupled to bus interface 205 to store operating program instructions. The DSP reads and executes a program stored in memory 207, which preferably is a flash memory module.

Status indicators 228, preferably LED's, provide a visual indication of the POD status. In the preferred embodiment, green LED's indicate the unit is powered on and red LED's flash to indicate the POD microphones are muted. Preferably the POD includes a battery 209 to permit the wireless unit to be relocated to any convenient location. The batteries may be replaceable consumables, but to reduce spent battery waste, rechargeable batteries are preferred. A line powered recharge adaptor 211 produces recharge current that is supplied to the battery by a charge circuit 213 that controls battery recharging and prevents overcharging of the batteries. If desired, the green LED's may be flashed in various ways to provide a visual indication that the batteries are being recharged and/or are fully charged, or the charge status of the batteries may periodically be indicated on the POD display 118.

FIG. 4 shows a schematic diagram of a preferred embodiment of an RF interface used in both the base 130, and in each POD 204 for signaling paths to facilitate exchange of data and control of the RF modules 126 and 202 in the base and PODs by the corresponding processor 120, 200. In the RF interface, inputs supplied to the respective RF module include SYS_CLOCK which provides the basic clock for the RF module and is gated on and off when needed. The PLL_ENABLE, PLL_DATA, and PLL_CLOCK input signals are used to adjust and multiply the carrier frequency, for example to allow frequency hopping or channel selection to occur. The transmit inputs supplied to the respective RF modules include a TDO signal, which provides the transmit data output that will be encoded onto the wireless communications channel using a suitable modulation scheme, for example, GMSK modulation. The PWR_ON input is used to turn the RF power amplifier on and off. The PWR_SEL input is used to select a low or a high transmit power level. Preferably frequency hopping is used. On the receive side, the outputs from the respective RF modules include a received data in (RDI) signal corresponding to the data input received at the RF module and the RXDSG and RSSI signals are used to indicate the received signal strength.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A conference phone system with multiple wireless conference phone units, comprising:
   a base station unit comprising a base station processor, a wireless conference phone unit interface that includes RF interface circuitry, and telephone network circuitry;
   a plurality of wireless conference phone units (PODs) that wirelessly couple to said base station unit, each individual POD further comprises:
      a plurality of microphones, a loudspeaker, a POD processor, a DSP, analog to digital conversion circuitry, digital to analog conversion circuitry, a base station interface that includes RF interface circuitry, circuitry for user input and output, all of which are electrically coupled together; and
      echo-cancelling circuitry configured to perform its own echo-cancellation by analyzing a received signal and subtracting the received signal from a signal generated by the microphones, and communicate audio information with said base station unit;
   wherein said base station unit:
      does not include microphones, loudspeakers, or user input circuitry;
      communicates audio information with said plurality of PODs;

receives and sums the audio information via a summer from said PODs before transmitting the audio information to far end conference participants; and does not transmit the received audio information from one said POD to another said POD.

2. The system of claim 1 wherein said individual POD comprises three microphones.

3. The system of claim 1 wherein said telephone network circuitry couples said base station unit to the public switched telephone network (PSTN) or a digital telephone network such as a voice over internet protocol (VoIP) network.

4. The system of claim 1 wherein said telephone network circuitry couples said base station unit to the digital telephone network such as a voice over internet protocol (VoIP) network.

5. A method to manufacture a conference phone system with multiple wireless conference phone units, comprising:

providing a base station unit comprising a base station processor, a wireless conference phone unit interface that includes RF interface circuitry, a telephone line interface;

providing a plurality of wireless conference phone units (PODs) that wirelessly couple to said base station unit, each individual POD further comprises: a plurality of microphones, a loudspeaker, a POD processor, a DSP, analog to digital conversion circuitry, digital to analog conversion circuitry, a base station interface that includes RF interface circuitry, circuitry for user input and output, all of which are electrically coupled together, each said POD including echo-cancelling circuitry configured to perform its own echo-cancellation by analyzing a received signal and subtracting he received signal from a signal generated by the microphones, and communicate audio information with said base station unit;

wherein said base station unit:

does not include microphones, loudspeakers, or user input circuitry; and communicates audio information with said plurality of PODs;

receives and sums the audio information via a summer from said PODs before transmitting the audio information to far end conference participants; and does not transmit the received audio information from one said POD to another said POD.

6. The method of claim 5 wherein said individual POD comprises three microphones.

7. The method of claim 5 wherein said telephone network circuitry couples said base station unit to the public switched telephone network (PSTN) or a digital telephone network such as a voice over internet protocol (VoIP) network.

8. The method of claim 5 wherein said telephone network circuitry couples said base station unit to the digital telephone network such as a voice over internet protocol (VoIP) network.

9. A method to use a conference phone system with multiple wireless conference phone units, comprising:

wirelessly communicating between a base station and a plurality of wireless conference phone units (PODs);

said base station unit further comprises a base station processor, a wireless conference phone unit interface that includes RF interface circuitry, a telephone line interface;

said plurality of wireless conference phone units (PODs) wirelessly couple to said base station unit, each individual POD further comprises:

a plurality of microphones, a loudspeaker, a POD processor, a DSP, analog to digital conversion circuitry, digital to analog conversion circuitry, a base station interface that includes RF interface circuitry, circuitry for user input and output, all of which are electrically coupled together; and echo-cancelling circuitry configured to perform its own echo-cancellation by analyzing a received signal and subtracting the received signal from a signal generated by the microphones, and communicate audio information with said base station unit;

wherein said base station unit:

does not include microphones, loudspeakers, or user input circuitry;

communicates audio information with said plurality of PODs;

receives and sums the audio information via a summer from said PODs before transmitting the audio information to far end conference participants; and does not transmit the received audio information from one said POD to another said POD.

10. The method of claim 9 wherein said individual POD comprises three microphones.

11. The method of claim 9 wherein said telephone network circuitry couples said base station unit to the public switched telephone network (PSTN) or a digital telephone network such as a voice over internet protocol (VoIP) network.

12. The method of claim 9 wherein said telephone network circuitry couples said base station unit to the digital telephone network such as a voice over internet protocol (VoIP) network.

* * * * *